(12) United States Patent
Jespersen

(10) Patent No.: US 11,346,401 B2
(45) Date of Patent: May 31, 2022

(54) BAYONET COUPLING AND MACHINING UNIT WITH SUCH BAYONET COUPLING

(71) Applicant: FLEX TRIM A/S, Roslev (DK)

(72) Inventor: Poul Erik Jespersen, Roslev (DK)

(73) Assignee: FLEX TRIM A/S, Roslev (DK)

( * ) Notice: Subject to any disclaimer, the term of this patent is extended or adjusted under 35 U.S.C. 154(b) by 745 days.

(21) Appl. No.: 16/305,601

(22) PCT Filed: May 31, 2017

(86) PCT No.: PCT/DK2017/050179
§ 371 (c)(1),
(2) Date: Nov. 29, 2018

(87) PCT Pub. No.: WO2017/207007
PCT Pub. Date: Dec. 7, 2017

(65) Prior Publication Data
US 2020/0324384 A1 Oct. 15, 2020

(30) Foreign Application Priority Data
May 31, 2016 (DK) .......................... PA 2016 70390

(51) Int. Cl.
*F16D 1/112* (2006.01)
*B24B 45/00* (2006.01)

(52) U.S. Cl.
CPC ............ *F16D 1/112* (2013.01); *B24B 45/006* (2013.01)

(58) Field of Classification Search
CPC ......... B24B 45/006; B24D 13/20; F16B 7/20; F16B 21/02; F16B 21/04; F16D 1/112;
(Continued)

(56) References Cited

U.S. PATENT DOCUMENTS 3,319,510 A * 5/1967 Rapata .................... F16B 21/02
411/40
3,623,281 A 11/1971 Moffat
(Continued)

FOREIGN PATENT DOCUMENTS

| CN | 101003125 A | 7/2007 |
| DE | 4430229 A1 | 2/1996 |

(Continued)

OTHER PUBLICATIONS

Supplementary European Search Report dated Apr. 22, 2020 for Application No. EP 17 80 5914.
(Continued)

*Primary Examiner* — Josh Skroupa
(74) *Attorney, Agent, or Firm* — Schmeiser, Olsen & Watts, LLP

(57) ABSTRACT

A bayonet coupling for mounting of a tool on a drive shaft of a machining unit. The drive shaft is connected to the tool via a bayonet coupling, which includes two coupling parts. The one coupling part is provided with a receiving groove for an engaging tab placed on the other coupling part. The receiving groove has a first section with an extension parallel to the axis of rotation and the second section of the receiving groove has an extension transverse, perpendicular, to the axis of rotation, so that the tool is driven via the engagement of the bayonet coupling.

11 Claims, 6 Drawing Sheets

(58) Field of Classification Search
CPC .......... Y10S 464/901; Y10T 403/7005; Y10T 403/7007
USPC ................. 403/348, 349, DIG. 4; 464/901
See application file for complete search history.

(56) References Cited

U.S. PATENT DOCUMENTS

| | | | |
|---|---|---|---|
| 4,434,586 | A | 3/1984 | Muller et al. |
| 4,661,009 | A | 4/1987 | Tripp |
| 4,730,952 | A | 3/1988 | Wiley |
| 5,626,435 | A * | 5/1997 | Wohlhuter .............. F16B 21/02 403/348 |
| 6,116,996 | A | 9/2000 | Yanase |
| 6,523,214 | B1 | 2/2003 | Kaiser |
| 8,011,848 | B2 | 9/2011 | Sockman et al. |
| 9,901,118 | B2 * | 2/2018 | Liu ......................... H01R 4/28 |
| 2013/0047812 | A1 | 2/2013 | McGehee |

FOREIGN PATENT DOCUMENTS

| | | |
|---|---|---|
| DE | 202006015427 U1 | 3/2007 |
| EP | 0147545 A2 | 7/1985 |
| EP | 0147545 A3 | 9/1986 |
| EP | 0904896 A2 | 3/1999 |
| EP | 1589244 A1 | 10/2005 |
| EP | 1697085 A1 | 9/2006 |
| EP | 1795301 A1 | 6/2007 |
| FR | 2313593 A1 | 12/1976 |
| GB | 1029317 A | 5/1966 |
| JP | 8-108363 A | 4/1996 |
| WO | 2014086367 A1 | 6/2014 |
| WO | WO2014086367 A1 | 6/2014 |

OTHER PUBLICATIONS

International Search Report—PCT/DK2017/050179.
Written Opinion—PCT/DK2017/050179.
Danish Search Report dated Dec. 19, 2016 for Application PA 2016 70390.

* cited by examiner

BAYONET COUPLING AND MACHINING UNIT WITH SUCH BAYONET COUPLING

CROSS-REFERENCE TO RELATED APPLICATIONS

This application claims priority to PCT Application No. PCT/DK2017/050179, having a filing date of May 31, 2017, which is based on DK Application No. PA 2016 70390, having a filing date of May 31, 2016, the entire contents both of which are hereby incorporated by reference.

FIELD OF TECHNOLOGY

The following concerns a bayonet coupling for mounting of a tool with tool elements on a drive shaft of a machining unit, which has a motor, which comprises a drive shaft for driving the tool about an axis of rotation, and where the drive shaft is connected in driving manner either directly or indirectly to the tool via a bayonet coupling, which comprises two coupling parts, the one coupling part being provided with a receiving groove for an engaging tab on the other coupling part, which receiving groove has a first section with an extension parallel to the axis of rotation and a second section with an extension transverse, perpendicular, to the axis of rotation, so that the tool is driven via the engagement of the bayonet coupling.

BACKGROUND

A machining unit is known where various types of tool elements are mounted on various tools, and where the mentioned tools are easy to replace, both to change between different tools and to replace the tool when worn down. One example of such a machining unit is described in WO2014/086367. For easy replacing, it employs bayonet couplings between a drive plate and a base plate for the tool.

Furthermore, there is known from U.S. Pat. No. 4,661,009 A a bayonet coupling of the kind mentioned above, and which possesses all the features that are described in the preamble of claim 1. This document shows an L-shaped receiving groove, and there is no mention that the receiving groove can have a T-shape.

It is desirable to be able to handle tools whose rotation can be oriented clockwise or counterclockwise.

However, this will present a disadvantage for elements which are connected via a bayonet coupling, since the engaging tab can only engage with the second section of the receiving groove upon rotation in one direction. When using a machining unit with rotation in the opposite direction, the engaging tab will find itself in the first section of the receiving groove. Thus, there is a risk of the tool becoming loosened from the drive shaft.

Insofar as the machining unit is used with rotation in the one direction such that the engaging tab engages with the second section of the receiving groove, there is likewise a disadvantage. When the motor is switched off, the tool of the machining unit may rotate by inertia into a position where the engaging tab finds itself in the first section of the receiving groove. Thus, there is a risk of the tool becoming loosened from the drive shaft.

SUMMARY

An aspect relates to a tool which is able to rotate in both directions without the risk of a bayonet connection between motor and tool being inadvertently released.

Yet another purpose is for a machining unit to be easily used together with various types of tool elements which are mounted on different tools, and where the mentioned tools are easy to replace in order to switch between different tools and to replace the tool when worn down.

These purposes are achieved according to embodiments of the present invention with a bayonet coupling for mounting of a tool with tool elements on a drive shaft of a machining unit, which has a motor, which comprises a drive shaft for driving the tool about an axis of rotation, and where the drive shaft is connected in driving manner either directly or indirectly to the tool via a bayonet coupling, which comprises two coupling parts, the one coupling part being provided with a receiving groove for an engaging tab on the other coupling part, which receiving groove has a first section with an extension parallel to the axis of rotation and a second section with an extension transverse, perpendicular, to the axis of rotation, so that the tool is driven via the engagement of the bayonet coupling, and which is characterized in that the second section of the receiving groove has an extension on either side of the first section, so as to form a T-shaped receiving groove. The bayonet coupling is devised with at least one locking tab with barbs for engaging with a corresponding toothing or a number of projections to establish a locking engagement of the locking tabs with the toothing or the projections upon rotation of the tool.

This ensures that the bayonet coupling can lock in both directions. The T-shaped groove ensures that the tool is secured to the drive shaft. The bayonet coupling can become engaged regardless of the direction of rotation of the drive shaft. Locking tab and corresponding toothing or projection ensures that the tool is in locking engagement in the second section of the receiving groove. The locking engagement ensures that the tool and the drive shaft, once entering into locking engagement, cannot rotate in relation to one another. This prevents the engaging tab from returning to the first part of the receiving groove, for example, during a sudden braking of the tool. This lowers the risk of the tool dropping off during use.

This increases the safety in use of a machining unit with rotating tools. This is because the tool, regardless of the direction of rotation, cannot become loosened from the drive shaft during use.

It is preferred to place one or more toothings or the projections on a drive shaft's hub portion and one or more corresponding locking tabs are placed in a bore in the tool for locking of the parts of the bayonet socket against mutual rotation.

This achieves greater safety during use of the machining unit with rotating tool. This is accomplished in that the locking engagement between at least one toothing or the projections and one or more locking tab holds the two parts of the bayonet coupling together. Thus, the tool cannot become loosened from the drive shaft, for example when the machining unit is halted, and the rotation of the tool ceases. Thus, the engaging tab cannot rotate back to the first section of the receiving groove, which prevents the tool from falling off the drive shaft.

The machining unit's drive shaft is connected in driving manner either directly or indirectly to the tool via the bayonet coupling.

In order to secure the tool on the drive shaft, the locking direction of the bayonet socket is such that at least one of the locking tabs of the bayonet socket engages with a corresponding toothing or projection in the direction of rotation of the drive shaft. The attempt of the parts of the bayonet socket to rotate in the opposite direction will be prevented by the locking engagement between at least one locking tab and the corresponding toothing.

The toothings or the projections are placed so that at least one locking tab engages with a toothing or one of the projections regardless of the direction of rotation of the locking direction of the bayonet coupling.

This accomplishes the same secure mounting of the tool on the machining unit's drive shaft regardless of the direction of rotation of the tool.

The toothing or the projections are shaped so that one surface of the toothing or the projections faces away from the locking tab or tabs which will engage when the engaging tab is in the first section of the receiving groove. All or some of the toothing or the projection will engage with the locking tabs after rotation of the first and/or second coupling part in relation to each other, when the engaging tab is in the second section of the receiving groove. The engagement between toothing or projection and locking tabs thus secure the coupling parts of the bayonet socket in a ratchet lock.

Each locking tab comprises a weakening line. This means that the locking tab is damaged when the tool and the hub portion on the machining unit's drive shaft is changed.

Since the locking tab comprises a weakening line, the tool becomes easy to remove from the machining unit after use. This is accomplished in that at least one of the locking tabs breaks off in or at the weakening line when the tool is removed, that is, when the tool is rotated in the opposite direction on the drive shaft in relation to the direction of rotation during the mounting of the tool. In this way, the at least one locking tab no longer engages with the corresponding toothing or projection. Hence, the tool can be rotated again opposite the locking direction and be removed from the machining unit.

The weakening line furthermore has the result that the tool cannot be mounted on the drive shaft once more. Hence, the tool is for onetime use, since it is destroyed upon being removed. Thus, the tool cannot be reused, or attempted to be removed to change the grinding bodies. This increases the safety for the user of the tool and prevents reusing of defective or worn tools or those at the end of their service life.

The bayonet coupling's at least one toothing or projection is placed on a hub portion on the drive shaft. The locking tabs are placed in a bore in the tool, where the bore is designed to accommodate the hub portion. The bayonet coupling's at least one locking tab thus locks against the corresponding toothing or projection on the hub portion when the bayonet socket is assembled.

This means that the hub portion on the drive shaft is not damaged when tool and machining unit are separated. Upon separation of tool and machining unit, it will be the locking tabs which are destroyed. Thus, it is the tool which is damaged, and not the hub portion.

The coupling part with the receiving groove is placed on the hub portion with the receiving groove arranged on the outer perimeter of the hub portion. The coupling part with the engaging tab is arranged in a bore on the tool part, the bore being designed to receive the hub portion.

Alternatively, the coupling part with the engaging tab is a hub portion with the engaging tab arranged on the outer perimeter of the hub portion. The coupling part with the receiving groove is arranged in a bore on the tool part, the bore being designed to receive the hub portion.

This means that the bayonet coupling can be constructed in two different ways. The hub portion may either have the coupling part with the receiving groove, or the hub portion may have the coupling part with the engaging tab, while the bore will have the opposite coupling part with either the engaging tab or the receiving groove.

This achieves flexibility in the construction of the bayonet coupling, such that the two different configurations can be used in order to adapt the machining unit with the tool to a specific customer or a specific task.

The construction of the bayonet coupling with T-shaped receiving groove means or T-shaped receiver in practice that both coupling parts have a T-shaped receiving groove, and both coupling parts have at least one engaging tab. It is possible to design the two receiving grooves to have the same shape and size. Accordingly, the coupling parts may be produced so that both coupling parts have an engaging tab, having the same shape and size. There is thus a choice as to which part is called the receiving groove and which part is called the engaging tab.

When the coupling part's receiving groove is placed on the hub portion, a toothing or projection is arranged in the second section of the receiving groove on either side of the first section. Thus, the two coupling parts of the bayonet coupling lock together regardless of the direction of rotation in which they are clamped together. This ensures the same secure mounting regardless of whether the machining unit is rotating clockwise or counterclockwise.

The bayonet coupling is designed so that the engaging tab comprises two locking tabs directed against each other. At least one of the locking tabs is designed to engage with one of the receiving groove's toothings or projections depending on the direction of rotation.

A symmetry is achieved in having the bayonet coupling's engaging tab with two locking tabs directed against one another, since there is one locking tab which engages with the toothing or the projections when the bayonet coupling is rotated in the clockwise direction and the other locking tab engages with the toothing or the projections when the bayonet coupling is rotated counterclockwise. This achieves the same locking effect regardless of the direction in which the tool is rotating.

Alternatively, the receiving groove is placed in the bore on the tool and the engaging tab on the hub portion. Thus, the receiving groove is bounded by locking tabs on either side of the receiving groove's first section, and the toothing or the projections are arranged on the hub portion at the dorsal engaging surface of the engaging tab, that is, the surface on the engaging tab which is opposite the end surface of the drive shaft.

The engaging tab's dorsal engaging surface is the portion of the engaging tab which faces away from the termination on the hub portion and the drive shaft. The engaging surface is flat, but it may also be shaped otherwise, such as slanting or rounded.

This ensures that, when the bayonet coupling is assembled, at least one locking tab will engage with a corresponding toothing or projection on the hub portion, regardless of whether the bayonet coupling is being rotated clockwise or counterclockwise during the assembly of the bayonet socket, for example, while mounting a tool on a drive shaft. This achieves the same locking of the tool on the drive shaft's hub portion regardless of the direction in which the tool is secured to the hub portion. To achieve a onetime-use tool, the coupling part with the locking tabs is placed on the tool.

The bayonet coupling's one coupling part is provided with at least two receiving grooves. Similarly, the second coupling part is also provided with at least two engaging tabs, such that the number of engaging tabs is the same as the number of receiving grooves.

This achieves a bayonet coupling having two locks between the bayonet coupling's one part and the bayonet coupling's other part. Among other things, this helps ensure a stable transfer of rotational force from the drive shaft to the tool. This also means that no unwanted vibrations are created on account of only one fastening point. Furthermore, this helps ensure that the tool is secured to the drive shaft at least at two locking points. This also helps prevent a tool from being inadvertently loosened from the drive shaft during a machining chore and possibly being thrown out from the machining unit.

It is possible to have more than two receiving grooves, such as three, four, five or six. There can be the same number of engaging tabs as the number of receiving grooves, or there can be fewer. For example, it is possible to have four receiving grooves, which are arranged in rotational symmetry on the one part of the bayonet coupling, while the other part of the bayonet coupling may have two engaging tabs, which will cooperate with two of the four receiving grooves on the other part.

The bayonet coupling is designed so that there is a collar or a flange in the bottom of the bore, where the collar or the flange is oriented transversely, perpendicularly, to the bore. This ensures that the coupling part on the hub portion is mounted at the proper height in the bore in the coupling part, so that the assembly process is easy. Furthermore, the collar or the flange ensures that the two coupling parts cannot shift in relation to each other axially along the axis of rotation. The hub portion will be clamped between the collar or flange of the bore and an upper boundary of the bore and thus lock the two coupling parts together. This upper boundary in one of the aforementioned variants is the aforementioned engaging tab. In the other variant, the upper boundary is a wall around the receiving groove's second section.

The receiving groove's second section has a size such that the engaging tab can slide into it without risk of movement in the axial direction of the drive shaft.

This ensures that the tool cannot move undesirably in the axial direction along the drive shaft and thereby alter the pressure exerted between the grinding, polishing or machining unit and the workpiece with possible consequent changes in the quality of the grinding, sanding or polishing work.

The receiving groove's second section is formed so that the top side and/or bottom side of the receiving groove are slightly inclined toward each other. In this way, the receiving groove's second part is slightly broader where it meets the receiving groove's first part as compared to the receiving groove's inner end. This ensures that, when the two parts of the bayonet coupling rotate to engage with each other, it is easier to ensure that the starting positions of the two parts are opposite each other and to then ensure that increased friction is achieved in the bayonet socket upon continued rotation in order to secure the two parts of the bayonet socket in relation to each other.

As an alternative to this, the engaging tab is formed with slightly wedge-shaped ends, such that the end or ends of the engaging tab are narrower than the central part of the engaging tab.

The bayonet coupling is formed on the drive shaft in that the hub portion comprises a central shaft and a hub bushing, which are connected to each other, by being molded or screwed together.

The central shaft may also alternatively comprise a collar, which is provided with at least one guide hole, which interacts with at least one guide tab on the hub bushing to establish a rotationally fixed connection.

The embodiment also concerns a machining unit with a bayonet socket, as described above, for mounting of a tool on a drive shaft of a motor unit.

The machining unit's tools have means of grinding, sanding, polishing, or similar chores, which are designated here as tool elements.

The machining unit may for example comprise a disk portion, which is secured to the drive shaft with the above-described bayonet socket, so that the tool is secured to the disk portion instead of being secured directly to the drive shaft, thereby achieving an indirect securing of the tool to the machining unit, in a manner already known.

This means that the bayonet coupling can be used with various existing equipment items, having direct and indirect coupling to the machining unit.

The machining unit is for example outfitted such that the tool and the separate disk portion are connected in that the disk portion is provided with first connection means or first connector, interacting in releasable manner with corresponding second connection means or second connector on the tool.

The first and second connection means or first and second connector are chosen among hook and fastener connections and bayonet couplings.

The tool elements of the tool comprise means of grinding, polishing, or similar chores.

BRIEF DESCRIPTION

Some of the embodiments will be described in detail, with references to the following Figures, wherein like designations denote like members, wherein.

DETAILED DESCRIPTION

The embodiment is described in relation to a bayonet coupling with two couplings, where the coupling part with the receiving groove is placed on the outside of a hub portion, seated on a drive shaft, while the coupling part with the engaging tab is placed in a bore. The bore is part of a tool. The bayonet coupling may have a different configuration, as described above.

Figure 1:
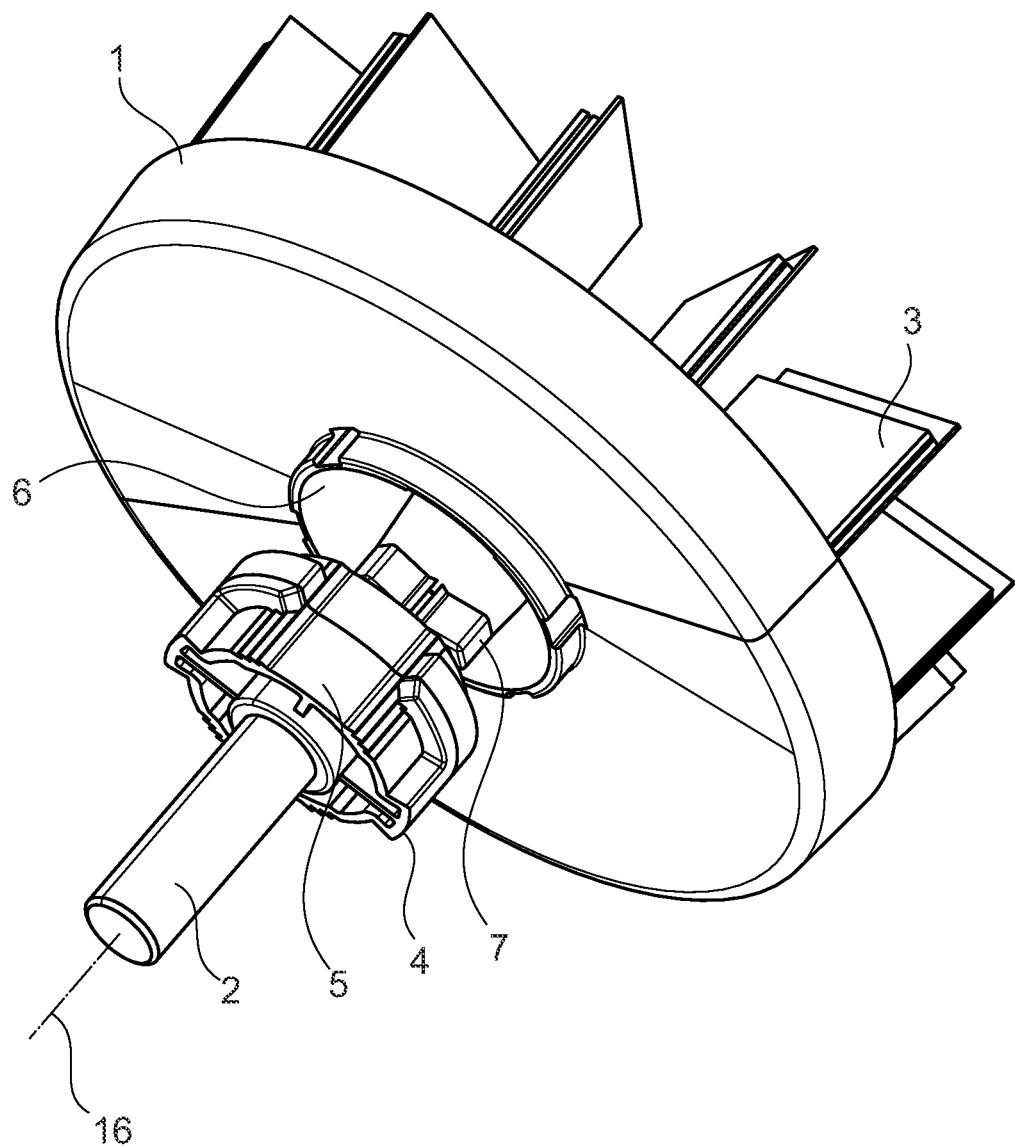
FIG. 1 shows a bayonet coupling for securing of a onetime-use tool to a drive shaft in a machining unit.

FIG. 1 shows a tool 1 which is to be secured to a drive shaft 2. The drive shaft 2 is driven by a motor (not shown in the figures) for rotation about an axis of rotation 16. The tool has mounted tool elements 3, such as grinding elements or polishing elements. On the drive shaft is seated a hub portion. The hub portion is designed with two receiving grooves 5, while only one receiving groove can be seen in FIG. 1. The tool 1 has a bore 6 placed centrally on the outside of the tool 1. Further down in the bore are two engaging tabs 7 (only one engaging tab can be seen in FIG. 1). As mentioned above, it is possible to have more or fewer receiving grooves and engaging tabs.

The hub portion 4 has a T-shaped receiving groove 5, and when the hub portions 4 is placed in the bore 6 the tool 1 can be rotated both clockwise and counterclockwise, and thus establish a locking engagement both in clockwise and counterclockwise rotation. This ensures that the machining unit is firmly seated on the drive shaft, regardless of the direction in which the tool rotates.

Figure 2:
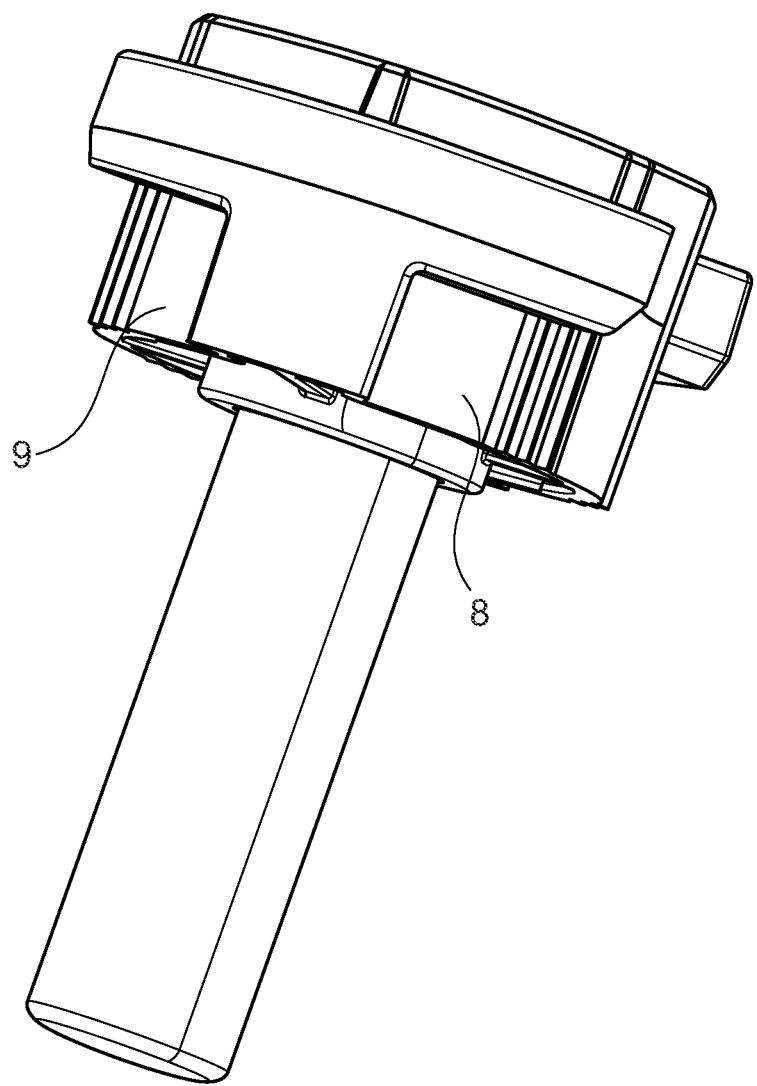
FIG. 2 shows a coupling part of the bayonet coupling on a hub portion of a drive shaft.
Figure 3A:
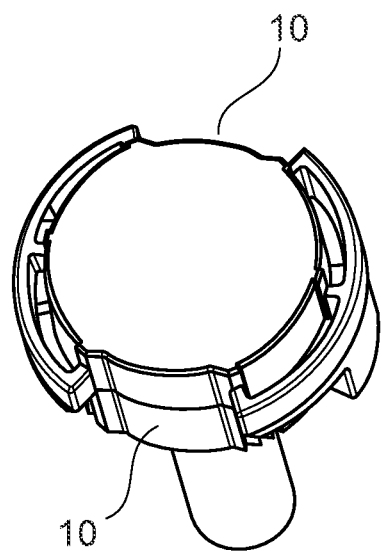
FIG. 3a shows the hub portion's coupling part from a first angle.
Figure 3B:
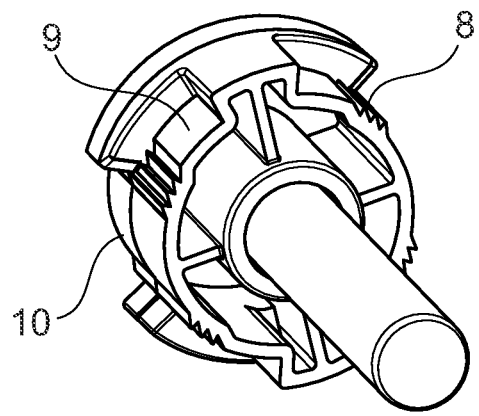
FIG. 3b shows the hub portion's coupling part from another angle.
Figure 3C:
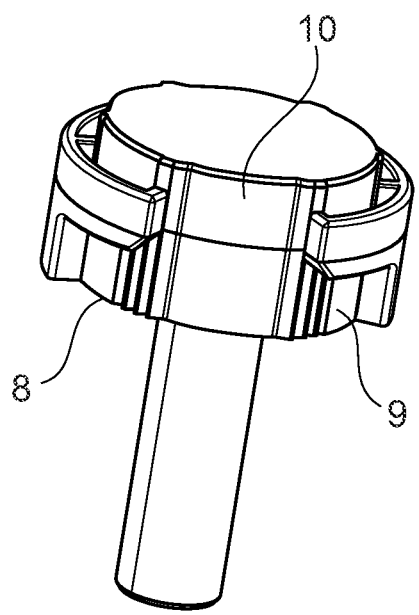
FIG. 3c shows the hub portion's coupling part from another angle.
Figure 3D:
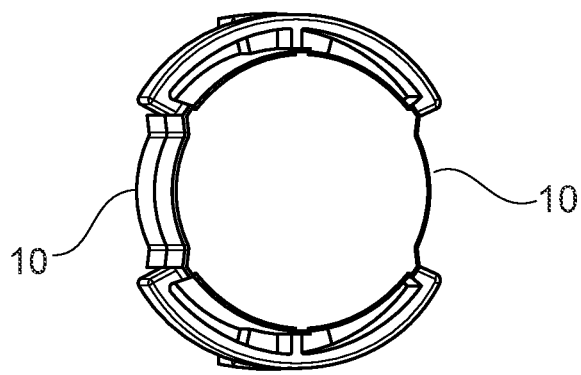
FIG. 3d shows the hub portion's coupling part from another angle.

FIG. 2 shows a hub portion, respectively right and left part of the second section of two different receiving grooves 5.

FIGS. 3a-3d shows the receiving groove from different angles. On the hub portion 4 shown there are two receiving grooves, each having a first section and a second section, which second section is divided into a right part 9 and a left part 8.

Figure 4:
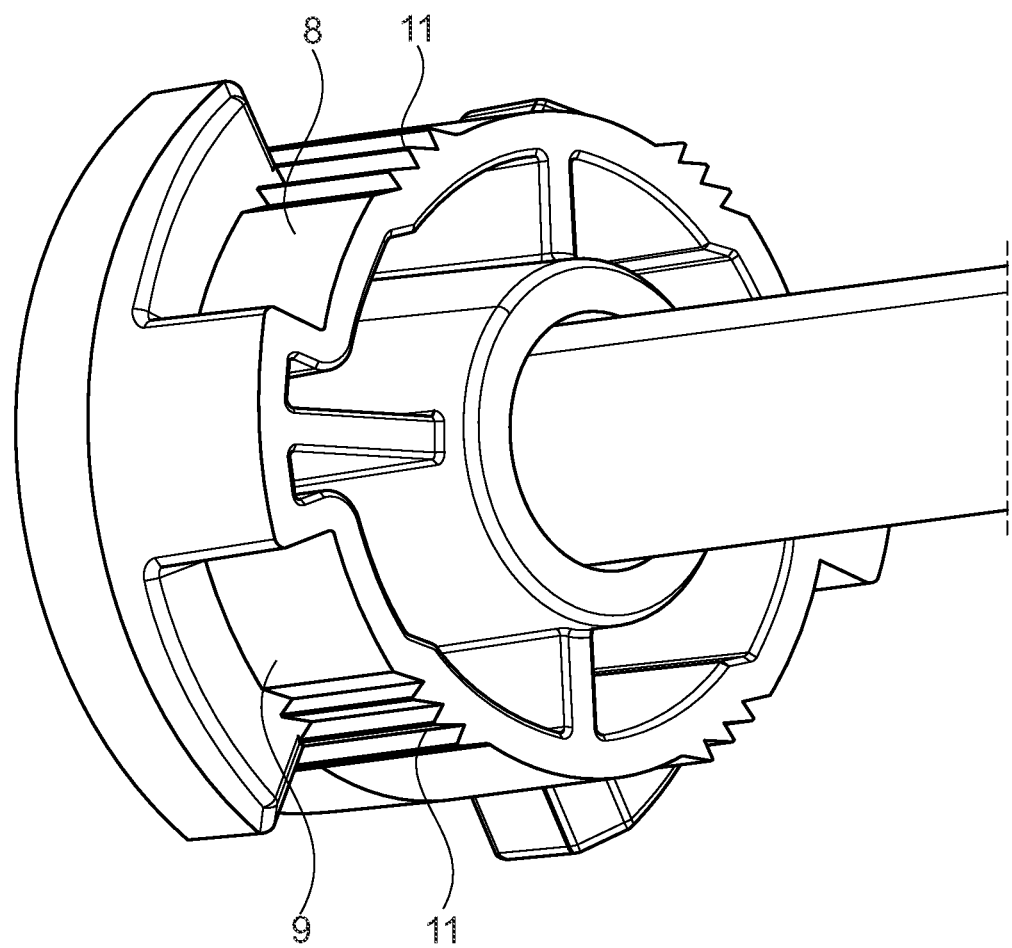
FIG. 4 shows the toothing or projection on the hub portion.

FIG. 4 shows the hub portion 4 with the right part of the second section of the receiving groove 9 and the left part of the second section of the receiving groove 8. In both right and left parts of the second section of the receiving groove there is placed a toothing 11. The toothing faces away from the first section of the receiving groove and interacts as a ratchet with the bore's locking tabs. The toothing ensures that the tool cannot rotate opposite the locking direction, for example, if the rotation stops suddenly, thereby ensuring that the tool does not drop off during use.

Figure 5:
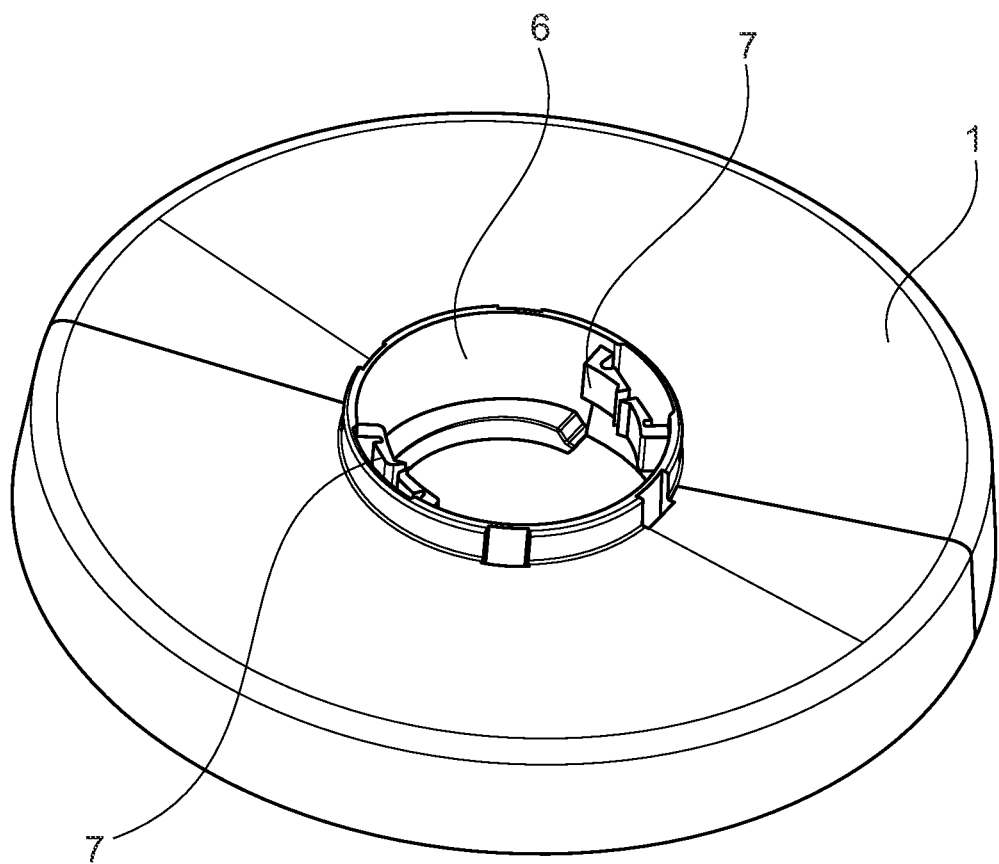
FIG. 5 shows a tool with bore with resilient tabs.

FIG. 5 shows the outside of the tool 1. The bore 6 is placed centrally on the outside of the tool 1. In the bore 6 are placed two engaging tabs 7 opposite each other.

Figure 6:
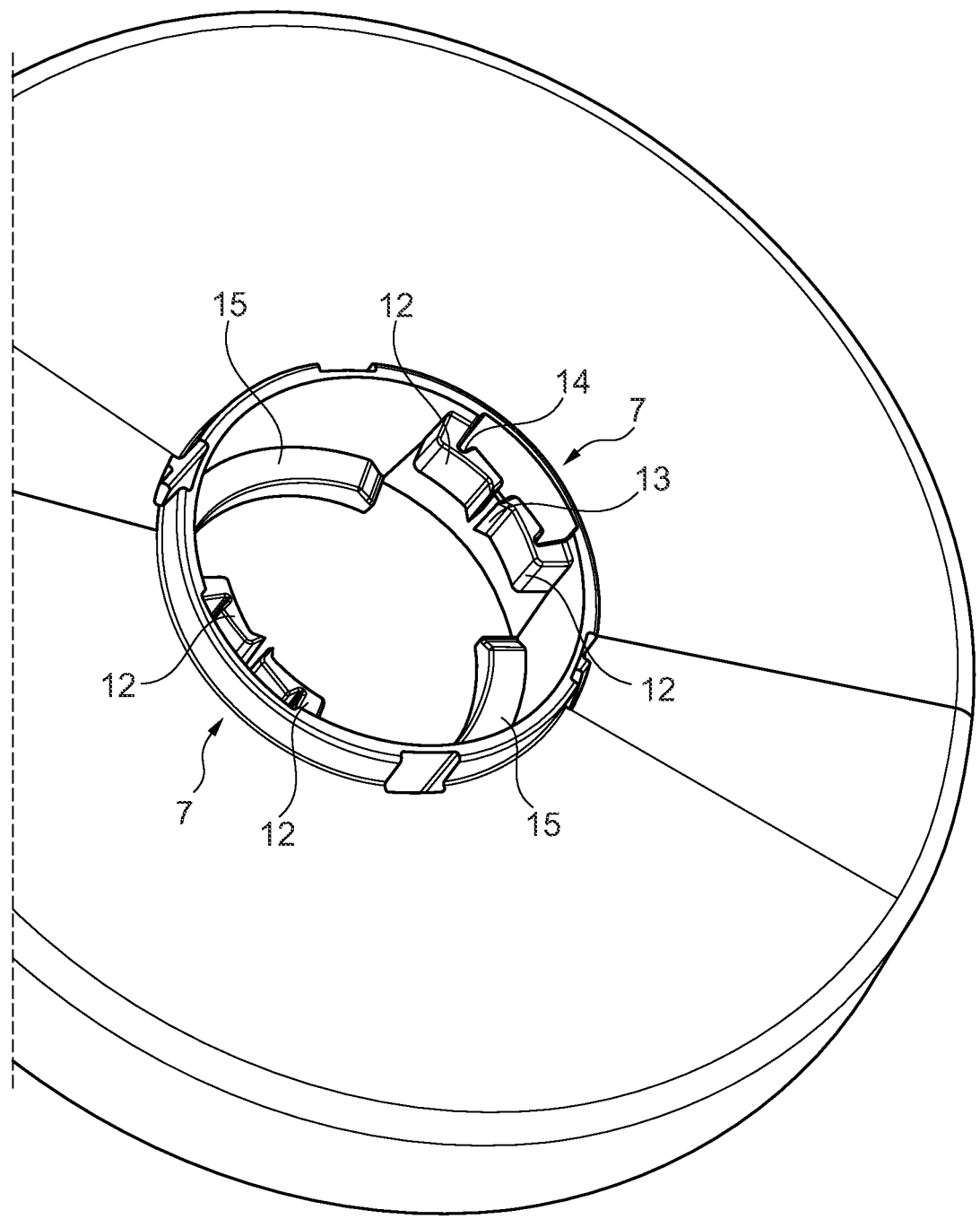
FIG. 6 shows details of the bore with resilient tabs and a lower collar.

FIG. 6 shows the inner portion of the bore. There are two engaging tabs 7, each one comprising two locking tabs 12, where the locking tabs are facing each other. On the outside of the locking tabs there is formed a barb 13. The barbs of the locking tabs form the second part of the ratchet together with the toothing 11 in the receiving groove 5 (FIG. 4).

The locking tabs 12 furthermore have a weakening line 14. When the bayonet coupling is removed, the locking tabs 12 will be bent or broken off, so that it is possible to turn the two parts of the bayonet coupling against the ratchet. The use of weakening lines is preferable for onetime use of machining units.

In the lowermost portion of the bore 6 there is placed a collar 15, which is perpendicular to the bore 6. The collar 15 means that the hub portion 4 cannot go through the tool 1, but instead the hub portion 4 is maintained at the height where the receiving groove 5 and engaging tab 7 have the proper height so that they easily engage with each other. Furthermore, the hub portion will be clamped between engaging tabs and the collar and thus ensure that the tool has no movement axially along the axis of rotation during use.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

FIGURE REFERENCES

1. Tool
2. Drive shaft
3. Tool elements
4. Hub portion
5. Receiving groove.
6. Bore
7. Engaging tab
8. Left part of second section of the receiving groove
9. Right part of second section of the receiving groove
10. First section of the receiving groove
11. Toothing
12. Locking tab
13. Barb
14. Weakening line
15. Collar
16. Axis of rotation

The invention claimed is:

1. A system comprising:
a bayonet coupling,
a tool with tool elements, and
a driveshaft attached to a motor for driving the tool about an axis of rotation,
wherein the bayonet coupling is configured for mounting of the tool with tool elements on the drive shaft
wherein the drive shaft is connected in driving manner either directly or indirectly to the tool via the bayonet coupling, and
wherein the bayonet coupling comprises two coupling parts, the one coupling part being provided with a receiving groove for an engaging tab on the other coupling part, which receiving groove has a first section with an extension parallel to the axis of rotation and a second section with an extension transverse, perpendicular, to the axis of rotation, so that the tool is driven via the engagement of the bayonet coupling, wherein the second section of the receiving groove has an extension on either side of the first section, so as to form a T-shaped receiving groove, and the bayonet coupling is devised with at least one locking tab with barbs for engaging with a corresponding toothing or a number of projections to establish a locking engagement of the locking tabs with the toothing or the projections upon rotation of the tool.

2. The system according to claim 1, wherein each locking tab comprises a weakening line so that the locking tab is damaged when the tool is removed from the drive shaft's hub portion.

3. The system according to claim 1, wherein one or more of the toothings or projections are placed on a hub portion on the drive shaft, and at least one locking tab is placed in a bore of the tool, and the bore is designed to receive the hub portion.

4. The system according to claim 1, wherein the coupling part with the receiving groove is the hub portion, the receiving groove being arranged at an outer perimeter of the hub portion, and the coupling part with the engaging tab is arranged in the bore of the tool.

5. The system according to claim 4, wherein the engaging tab comprises two locking tabs directed against one another, and the toothing or the projections are arranged in the receiving groove's second section.

6. The system according to claim 1, wherein the coupling part with the engaging tab is a hub portion, the engaging tab being arranged on an outer perimeter of the hub portion, and the coupling part with the receiving groove is arranged in the bore of the tool.

7. The system according to claim 6, wherein the receiving groove's boundary contains locking tabs on either side of the receiving groove's first section, and the toothing or the projections are arranged on the hub portion on the dorsal engaging surface of the engaging tab.

8. The system according to claim 1, wherein the one coupling part is provided with at least two receiving grooves, and the second coupling part is provided with at least two engaging tabs, so that the number of receiving grooves is at least the same as the number of engaging tabs.

9. The system according to claim 1, wherein the receiving groove's second section has a size such that the engaging tab can slide into it without risk of movement in the direction of the axis of rotation.

10. A machining unit, for grinding, sanding, polishing or similar work tasks, wherein the machining unit comprises the system according to claim 1.

11. A bayonet coupling for engaging a tool to be driven about an axis of rotation by a drive shaft of a machine, the bayonet coupling comprising:
   a first coupling part and a second coupling part, the first coupling part having a receiving groove for an engaging tab on the second coupling part, wherein the receiving groove has a first section with a first extension and a second section with a second extension transverse, perpendicular, to the first extension, wherein the second section of the receiving groove has an extension on either side of the first section, so as to form a T-shaped receiving groove, and
   at least one locking tab with barbs configured to engage with a corresponding toothing or a number of projections and to establish a locking engagement of the locking tabs with the toothing or the projections.

* * * * *